(12) United States Patent
Mao et al.

(10) Patent No.: US 9,782,852 B2
(45) Date of Patent: Oct. 10, 2017

(54) PLASMA TORCH WITH LCD DISPLAY WITH SETTINGS ADJUSTMENT AND FAULT DIAGNOSIS

(71) Applicant: Hypertherm, Inc., Hanover, NH (US)

(72) Inventors: Junsong Mao, Hanover, NH (US); Michael F. Kornprobst, Lebanon, NH (US); Brett A. Hansen, Mapleton, UT (US); E. Michael Shipulski, Etna, NH (US)

(73) Assignee: Hypertherm, Inc., Hanover, NH (US)

( * ) Notice: Subject to any disclaimer, the term of this patent is extended or adjusted under 35 U.S.C. 154(b) by 266 days.

(21) Appl. No.: 14/486,569

(22) Filed: Sep. 15, 2014

(65) Prior Publication Data

US 2015/0001193 A1    Jan. 1, 2015

Related U.S. Application Data

(63) Continuation-in-part of application No. 13/151,799, filed on Jun. 2, 2011, now Pat. No. 8,853,588, and a
(Continued)

(51) Int. Cl.
   *B23K 10/00*    (2006.01)
(52) U.S. Cl.
   CPC ............ *B23K 10/006* (2013.01); *B23K 10/00* (2013.01)
(58) Field of Classification Search
   CPC ........ B23K 10/00; B23K 10/006; H05H 1/34; H05H 1/26; H05H 1/36
(Continued)

(56) References Cited

U.S. PATENT DOCUMENTS

| 2,985,050 A | 5/1961 | Schwacha |
| 3,010,012 A | 11/1961 | Tuthill |

(Continued)

FOREIGN PATENT DOCUMENTS

| CA | 2439213 | 10/2006 |
| EP | 0508482 | 10/1992 |

(Continued)

OTHER PUBLICATIONS

Torchmate® Arc Voltage Torch Height Control—Operation Manual, Applied Robotics, Inc., Oct. 2005, pp. 1-19.
(Continued)

*Primary Examiner* — Mark Paschall
(74) *Attorney, Agent, or Firm* — Proskauer Rose LLP

(57) ABSTRACT

A plasma arc cutting system includes a power supply and a plasma torch attachable to the power supply. The plasma torch generates a plasma arc for cutting a workpiece. A reader is associated with the plasma torch. The reader is capable of reading stored data from an identification device located on a cartridge or a consumable component of the plasma arc cutting system. A controller is within the plasma arc cutting system and in communication with the power supply. The controller is capable of automatically establishing operating parameters of the plasma arc cutting system based upon the data stored on the identification device. An override feature allows a user of the plasma arc cutting system to override the automatically established operating parameters of the torch and to input user selected operating parameters.

19 Claims, 11 Drawing Sheets

Related U.S. Application Data continuation-in-part of application No. 14/079,163, filed on Nov. 13, 2013, which is a continuation-in-part of application No. 14/075,692, filed on Nov. 8, 2013, which is a continuation-in-part of application No. 13/838,919, filed on Mar. 15, 2013, which is a continuation-in-part of application No. 13/560,059, filed on Jul. 27, 2012, which is a continuation-in-part of application No. 13/439,259, filed on Apr. 4, 2012, application No. 14/486,569, which is a continuation-in-part of application No. 13/949,364, filed on Jul. 24, 2013.

(60) Provisional application No. 61/365,145, filed on Jul. 16, 2010, provisional application No. 62/028,065, filed on Jul. 23, 2014.

(58) Field of Classification Search
USPC .............. 219/121.39, 121.48, 121.5, 121.54
See application file for complete search history.

(56) References Cited

U.S. PATENT DOCUMENTS

| | | |
|---|---|---|
| 3,018,360 A | 1/1962 | Engel |
| 3,518,401 A | 6/1970 | Mathews |
| 3,602,683 A | 8/1971 | Hishida et al. |
| 4,497,029 A | 1/1985 | Kiyokawa |
| 4,519,835 A | 5/1985 | Gauvin et al. |
| 4,588,880 A | 5/1986 | Hesser |
| 4,733,052 A | 3/1988 | Nilsson et al. |
| 4,742,470 A | 5/1988 | Juengel |
| 5,018,670 A | 5/1991 | Chalmers |
| 5,050,106 A | 9/1991 | Yamamoto et al. |
| 5,086,655 A | 2/1992 | Fredericks et al. |
| 5,099,226 A | 3/1992 | Andrews |
| 5,248,867 A | 9/1993 | Ohba et al. |
| 5,309,683 A | 5/1994 | Hockett |
| 5,357,076 A | 10/1994 | Blankenship |
| 5,381,487 A | 1/1995 | Shamos |
| 5,388,965 A | 2/1995 | Fehn |
| 5,390,964 A | 2/1995 | Gray, Jr. |
| 5,400,389 A | 3/1995 | Niiyama et al. |
| 5,440,477 A | 8/1995 | Rohrberg et al. |
| 5,500,512 A | 3/1996 | Goldblatt |
| 5,556,562 A | 9/1996 | Sorenson |
| 5,653,264 A | 8/1997 | Atkinson |
| 5,717,187 A | 2/1998 | Rogozinski et al. |
| 5,860,849 A | 1/1999 | Miller |
| 6,047,579 A | 4/2000 | Schmitz |
| 6,130,407 A | 10/2000 | Villafuerte |
| 6,133,542 A | 10/2000 | Dvorak et al. |
| 6,201,207 B1 | 3/2001 | Maruyama et al. |
| 6,259,059 B1 | 7/2001 | Hsu |
| 6,267,291 B1 | 7/2001 | Blankenship et al. |
| 6,326,583 B1 | 12/2001 | Hardwick et al. |
| 6,409,476 B2 | 6/2002 | Mills |
| 6,479,793 B1 | 11/2002 | Wittmann et al. |
| 6,510,984 B2 | 1/2003 | Blankenship et al. |
| 6,539,813 B1 | 4/2003 | Horiuchi et al. |
| 6,563,085 B2 | 5/2003 | Lanouette et al. |
| 6,657,162 B1 | 12/2003 | Jung et al. |
| 6,693,252 B2 | 2/2004 | Zhang et al. |
| 6,707,304 B2 | 3/2004 | Buhler et al. |
| 6,717,096 B2 | 4/2004 | Hewett et al. |
| 6,772,040 B1 | 8/2004 | Picard et al. |
| 6,781,085 B2 | 8/2004 | Ulrich et al. |
| 6,960,737 B2 | 11/2005 | Tatham |
| 6,980,704 B2* | 12/2005 | Kia ............... B41J 2/17503 382/188 |
| 6,995,545 B2 | 2/2006 | Tracy et al. |
| 7,030,337 B2 | 4/2006 | Baker et al. |
| 7,032,814 B2* | 4/2006 | Blankenship ........ B23K 9/1062 219/54 |
| 7,115,833 B2 | 10/2006 | Higgins et al. |
| 7,186,944 B2 | 3/2007 | Matus et al. |
| 7,307,533 B2 | 12/2007 | Ishii |
| 7,358,458 B2 | 4/2008 | Daniel |
| 7,375,302 B2 | 5/2008 | Twarog et al. |
| 7,645,960 B2 | 1/2010 | Stava |
| 7,671,294 B2 | 3/2010 | Belashchenko et al. |
| 7,680,625 B2 | 3/2010 | Trowbridge et al. |
| 7,843,334 B2 | 11/2010 | Kumagai et al. |
| 8,203,095 B2 | 6/2012 | Storm et al. |
| 8,204,618 B2 | 6/2012 | Young, Jr. et al. |
| 8,263,896 B2 | 9/2012 | Schneider |
| 8,272,794 B2 | 9/2012 | Silchenstedt et al. |
| 8,316,742 B2 | 11/2012 | Craig |
| 8,376,671 B2 | 2/2013 | Kaneko |
| 8,395,076 B2 | 3/2013 | Matus |
| 8,431,862 B2 | 4/2013 | Kachline |
| 8,686,318 B2 | 4/2014 | Albrecht |
| 8,748,776 B2 | 6/2014 | Albrecht |
| 8,759,715 B2 | 6/2014 | Narayanan et al. |
| 8,766,132 B2 | 7/2014 | Blankenship et al. |
| 8,859,828 B2 | 10/2014 | Liu et al. |
| 9,031,683 B2 | 5/2015 | Elfstrom et al. |
| 9,129,330 B2* | 9/2015 | Albrecht ........... G06Q 30/0633 |
| 2002/0117484 A1 | 8/2002 | Jones et al. |
| 2003/0025598 A1 | 2/2003 | Wolf et al. |
| 2003/0094487 A1 | 5/2003 | Blankenship et al. |
| 2003/0148709 A1 | 8/2003 | Anand et al. |
| 2004/0031776 A1 | 2/2004 | Gevelber et al. |
| 2004/0106101 A1* | 6/2004 | Evans ................. G06Q 50/22 435/5 |
| 2004/0173583 A1 | 9/2004 | Iriyama et al. |
| 2005/0077273 A1 | 4/2005 | Matus et al. |
| 2005/0109738 A1 | 5/2005 | Hewett et al. |
| 2005/0145688 A1 | 7/2005 | Milenkovic et al. |
| 2006/0006154 A1 | 1/2006 | Koike |
| 2006/0070986 A1 | 4/2006 | Ihde et al. |
| 2006/0163228 A1 | 7/2006 | Daniel |
| 2006/0163230 A1 | 7/2006 | Kaufman |
| 2006/0201923 A1 | 9/2006 | Hutchison |
| 2006/0215389 A1 | 9/2006 | Fosbinder et al. |
| 2006/0289406 A1 | 12/2006 | Helenius et al. |
| 2007/0012099 A1 | 1/2007 | Becourt |
| 2007/0051711 A1 | 3/2007 | Kachline |
| 2007/0080149 A1 | 4/2007 | Albrecht |
| 2007/0080150 A1 | 4/2007 | Albrecht |
| 2007/0080151 A1 | 4/2007 | Albrecht |
| 2007/0080152 A1 | 4/2007 | Albrecht |
| 2007/0080153 A1 | 4/2007 | Albrecht et al. |
| 2007/0294608 A1 | 12/2007 | Winterhalter et al. |
| 2008/0001752 A1 | 1/2008 | Bruns |
| 2008/0011821 A1 | 1/2008 | Ellender et al. |
| 2008/0061049 A1* | 3/2008 | Albrecht ............ B23K 9/0953 219/137 R |
| 2008/0066596 A1 | 3/2008 | Yamaguchi |
| 2008/0093476 A1 | 4/2008 | Johnson et al. |
| 2008/0149608 A1 | 6/2008 | Albrecht |
| 2008/0149686 A1 | 6/2008 | Daniel et al. |
| 2008/0156783 A1 | 7/2008 | Vanden Heuvel et al. |
| 2008/0223952 A1 | 9/2008 | Wernli et al. |
| 2008/0257874 A1* | 10/2008 | Kaufman ............. B23K 9/124 219/137 R |
| 2008/0308641 A1 | 12/2008 | Finn |
| 2009/0008370 A1 | 1/2009 | Salsich et al. |
| 2009/0057286 A1 | 3/2009 | Ihara et al. |
| 2009/0065489 A1 | 3/2009 | Duffy |
| 2009/0107960 A1 | 4/2009 | Hampton |
| 2009/0152255 A1 | 6/2009 | Ma |
| 2009/0159571 A1 | 6/2009 | Salsich |
| 2009/0159572 A1 | 6/2009 | Salsich |
| 2009/0159575 A1 | 6/2009 | Salsich |
| 2009/0159577 A1 | 6/2009 | Sommerfeld |
| 2009/0163130 A1 | 6/2009 | Zambergs |
| 2009/0184098 A1 | 7/2009 | Daniel et al. |
| 2009/0212027 A1 | 8/2009 | Borowy |
| 2009/0222804 A1 | 9/2009 | Kaufman |
| 2009/0230097 A1 | 9/2009 | Liebold et al. |
| 2009/0288532 A1 | 11/2009 | Hashish |
| 2009/0294415 A1 | 12/2009 | Salsich et al. |

(56) References Cited

U.S. PATENT DOCUMENTS

| | | |
|---|---|---|
| 2010/0084381 A1 | 4/2010 | Indraczek et al. |
| 2010/0155377 A1 | 6/2010 | Lindsay et al. |
| 2010/0324868 A1 | 12/2010 | Russell et al. |
| 2011/0000893 A1 | 1/2011 | Blankenship et al. |
| 2011/0114616 A1 | 5/2011 | Albrecht |
| 2011/0163857 A1 | 7/2011 | August et al. |
| 2011/0220630 A1 | 9/2011 | Speilman et al. |
| 2011/0294401 A1 | 12/2011 | Habermann et al. |
| 2012/0021676 A1 | 1/2012 | Schubert et al. |
| 2012/0138583 A1 | 6/2012 | Winn et al. |
| 2012/0234803 A1 | 9/2012 | Liu et al. |
| 2012/0241428 A1 | 9/2012 | Kowaleski |
| 2013/0068732 A1* | 3/2013 | Watson ............... A61M 16/12 219/121.5 |
| 2013/0210319 A1 | 8/2013 | Gramling et al. |
| 2013/0263420 A1 | 10/2013 | Shipulski |
| 2013/0264317 A1 | 10/2013 | Hoffa et al. |
| 2013/0264320 A1 | 10/2013 | Shipulski et al. |
| 2014/0335761 A1 | 11/2014 | Chou et al. |

FOREIGN PATENT DOCUMENTS

| | | |
|---|---|---|
| EP | 1065620 | 1/2001 |
| EP | 1117279 | 7/2001 |
| EP | 1288016 | 3/2003 |
| EP | 1516688 | 3/2005 |
| EP | 1522371 | 4/2005 |
| JP | S61-63368 | 4/1986 |
| WO | 2008/144785 | 12/2008 |
| WO | 2009/142941 A2 | 11/2009 |
| WO | 2010/142858 | 12/2010 |
| WO | 2013/000700 | 1/2013 |
| WO | 2013/151602 | 10/2013 |
| WO | 2013/151886 | 10/2013 |

OTHER PUBLICATIONS

Trumpf Press Release, New RFID lens provides LensLine sensor system with improved condition checking capabilities, online press release available at http://www.trumpf.com/nc/en/press/press-releases/press-release/rec-uid/266044.html, Aug. 12, 2013. (4 pages).

* cited by examiner

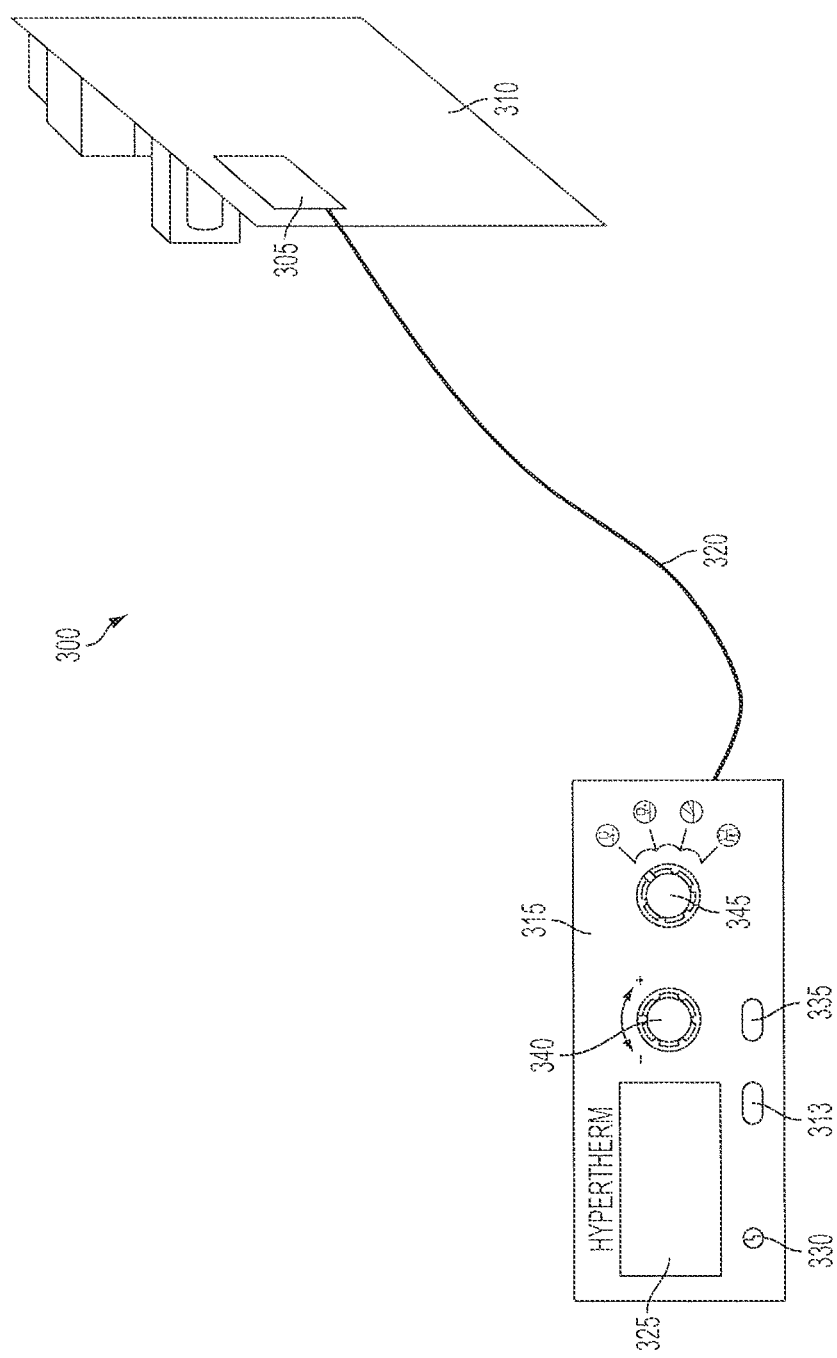

FIG. 8

PLASMA TORCH WITH LCD DISPLAY WITH SETTINGS ADJUSTMENT AND FAULT DIAGNOSIS

RELATED APPLICATIONS

This application is a continuation-in-part of U.S. patent application Ser. No. 13/151,799, filed Jun. 2, 2011, which claims the benefit of and priority to U.S. Provisional Application No. 61/365,145, filed Jul. 16, 2010. This application is also a continuation-in-part of U.S. patent application Ser. No. 14/079,163, filed Nov. 13, 2013, which is a continuation-in-part of U.S. Ser. No. 14/075,692, filed Nov. 8, 2013, which is a continuation-in-part of U.S. Ser. No. 13/838,919, filed Mar. 15, 2013, which is a continuation-in-part of U.S. Ser. No. 13/560,059, filed Jul. 27, 2012, which is a continuation-in-part of U.S. Ser. No. 13/439,259, filed Apr. 4, 2012. This application is also a continuation-in-part of U.S. Ser. No. 13/949,364, filed Jul. 24, 2013. This application claims benefit of U.S. Provisional Application No. 62/028,065, filed Jul. 23, 2014. The contents of all of these applications are hereby incorporated herein by reference in their entireties.

TECHNICAL FIELD

The present invention relates generally to plasma arc cutting torches, and more particularly, to plasma torches with LCD displays with settings adjustment and fault diagnosis.

BACKGROUND

Plasma arc torches are widely used in the cutting and marking of materials. A plasma torch generally includes an electrode and a nozzle having a central exit orifice mounted within a torch body, electrical connections, passages for cooling, and passages for arc control fluids (e.g., plasma gas). Optionally, a swirl ring is employed to control fluid flow patterns in the plasma chamber formed between the electrode and nozzle. In some torches, a retaining cap can be used to maintain the nozzle and/or swirl ring in the plasma arc torch. The torch produces a plasma arc, a constricted ionized jet of a gas with high temperature and high momentum. Gases used in the torch can be non-reactive (e.g., argon or nitrogen) or reactive (e.g., oxygen or air). In operation, a pilot arc is first generated between the electrode (cathode) and the nozzle (anode). Generation of the pilot arc can be by means of a high frequency, high voltage signal coupled to a DC power supply and the torch or by means of any of a variety of contact starting methods.

One category of handheld plasma arc torch systems includes a manual gas control knob on the control panel of the power supply or power supply housing. Before cutting a workpiece, an operator is required to manually adjust the gas pressure or gas flow rate based on the process parameters set forth in a cut chart. The operator manually adjusts the gas pressure or flow rate for each type of cut and therefore constantly refers to the cut chart for the appropriate gas pressure or flow rate. Moreover, if the operator inadvertently inputs an incorrect gas pressure or flow rate, the plasma arc torch can operate incorrectly or inefficiently.

Another category of handheld systems eliminates the gas control by automatically setting the gas pressure based on the user-selected current level and mode (i.e., gouging or cutting). This category of handheld plasma arc torches does not provide the operator with any flexibility in setting the gas pressure beyond the preset automated systems. Therefore, if the operator determines that the gas pressure or flow rate should be changed due to a changed operating parameter or to optimize the plasma arc torch, the operator does not have the flexibility to make these operational and/or optimizing adjustments.

SUMMARY OF THE INVENTION

A need, therefore, exists for a plasma arc torch (e.g., a handheld plasma arc torch) that can allow an operator to have the gas pressure or flow rate settings automatically determined or to allow the operator to manually adjust the gas pressure or gas flow rate (e.g., by hand with a valve control mechanism). This provides the operator with flexibility in setting the gas pressure or flow rate beyond a purely automated system. The selection of automatic or manual gas control can occur through a control panel on the power supply or the plasma arc torch system. Alternatively or in addition, the gas pressure or gas flow rate settings can be automatically determined through installation of a cartridge in the plasma arc torch system. The cartridge can have an identification mechanism that includes information that is readable by the plasma arc torch system and is used to configure the plasma arc torch system. Further details regarding such identification systems can be found, for example, in U.S. patent application Ser. No. 14/079,163, filed Nov. 13, 2013, the contents of which are incorporated herein by reference.

A need also exists for a plasma arc torch system that can display descriptive functional, fault, or error messages as well as service information through a display on the power supply or the plasma arc torch system. This information can be displayed in different fault indication levels and can be used by the operator to adjust the gas pressure or gas flow rate in response to the fault codes. In addition, the fault information can be stored in a non-volatile memory that can provide the operator with previous fault information that can be needed, for example, when a service call is placed.

In one aspect, the invention features a portable plasma arc cutting system that includes a power supply and a plasma torch attachable to the power supply. The plasma torch can generate a plasma arc for cutting a workpiece. A gas valve is disposed in the portable plasma arc cutting system or the plasma torch. The gas valve establishes a gas flow rate or a gas pressure in the plasma torch. A controller is within the portable plasma arc cutting system and is in communication with the power supply. The controller is capable of automatically manipulating the gas valve to establish the gas flow rate or the gas pressure based upon a predetermined operating condition. A cartridge is attachable to the plasma torch. The cartridge includes an identification device having information for establishing the predetermined operating condition. The identification device is readable by a reader of the plasma arc cutting system. The controller automatically establishes the gas flow rate or the gas pressure based upon the predetermined operating condition.

The portable plasma arc cutting system can include an override feature that allows a user of the plasma arc cutting system to override the automatically determined gas flow rate. The identification mechanism can include a RFID tag. A user activated feature can be in communication with the controller. The feature can be a manual override button that allows the user to override the automatically determined settings and use separate control settings to adjust one or more cutting parameters (e.g., current, gas flow pressure, gas flow rate, etc.) manually. The feature can also be a switch. The switch can have a first setting which causes the controller to automatically establish the gas flow rate or the gas pressure based upon the predetermined operating condition, and a second setting which causes the controller to establish one of a user-determined gas flow rate or a user-determined gas pressure.

In another aspect, the invention features a portable plasma arc cutting system that includes a power supply and a plasma torch attachable to the power supply. The plasma torch generates a plasma arc for cutting a work piece. A display is disposed on the portable plasma arc cutting system for providing a user with information about the portable plasma arc cutting system. A controller is in communication with the power supply. The controller is capable of displaying the operation mode or the service mode on the display. A cartridge is attachable to the plasma torch. The cartridge includes an identification device having information for establishing the predetermined operating condition. The identification device is readable by a reader of the plasma arc cutting system.

The display can have an operation mode for displaying operation data about the plasma arc cutting system on the display. The operating data can include at least one of a gas pressure or a current. The display can have a service mode for displaying fault data about the plasma arc cutting system on the display. The controller can be capable of displaying the operation mode or the service mode on the display. A user activated switch can be in communication with the controller and the display. The switch can have an operation setting that causes the controller to provide the operation mode data to the display and a service setting that causes the controller to provide the service mode data to the display. The switch can be configured to enable the user to toggle between at least the operation and service settings. The display can include a LED.

In another aspect, the invention features a plasma arc cutting system that includes means for supplying power and means for attaching a plasma torch to the means for supplying power. The plasma torch initiates a plasma arc for cutting a work piece. The means for supplying power can be, for example, a power supply or an ac/dc power source. The plasma torch can be attached to the means for supplying power by, for example, leads, or a connector (e.g., threads). The plasma arc cutting system also includes means for establishing a gas flow rate or a gas pressure from a gas source to the plasma torch, for example, a valve. The plasma arc cutting system includes means for automatically establishing the gas flow rate or the gas pressure of the gas based upon a predetermined operating condition, for example, through a controller (e.g., a microcontroller, a CPU, or a DSP). The plasma cutting system also includes means for manually establishing the gas flow rate or the gas pressure of the gas. The means for manually establishing the gas flow rate or the gas pressure of the gas can override the means for automatically establishing the gas flow rate or the gas pressure.

The torch can be a handheld plasma arc torch. In some embodiments, the controller is a microcontroller, a CPU or a DSP. The user interface can be an LCD-type user interface, an LED display, a computer screen, a video display, a touch screen display, or any other type of display.

In some embodiments, the portable plasma arc cutting system also includes a control panel disposed on the portable plasma arc cutting system. The control panel can include the user activated switch and a user interface. The user interface can display a first display screen when the switch is in the first setting and a manual display screen when the switch is the in the second setting. The manual display screen can display a pressure or flow rate setting which is indicative of the gas pressure or flow rate supplied to the torch. In some embodiments, the control panel further includes at least one dial or button for adjusting at least one of the gas pressure or the gas flow rate in the second setting.

In some embodiments, the predetermined operating condition is at least one of a current setting, power supply type, torch type, material type, cutting surface, or material thickness. In some embodiments, the predetermined operating condition is provided through information included in a cartridge of the plasma arc torch system. In some embodiments, the information is included in an identification mechanism of the cartridge, the identification mechanism readable by a reader of the plasma arc torch system. In some embodiments, the identification mechanism is a RFID tag, and the plasma arc torch system contains a RFID reader. In some embodiments, other means for communicating information are used, including bluetooth, WiFi, remote device and/or mobile device connections. One skilled in the art would realize that a range of devices can be used to communicate the information that establishes the predetermined operating condition. In some embodiments, the predetermined operating condition can be set by a control on the torch or on a remote or mobile device.

The portable plasma arc cutting system can further include memory disposed in the power supply and in communication with the controller. The memory can be configured to save at least one of the predetermined operating condition, user-determined gas flow rate, or the user-determined gas pressure that was last entered into the plasma arc cutting system. The memory can also be configured to save the fault data in a fault log.

In some embodiments, the fault data displayed in the service mode includes fault codes.

Warnings can be displayed in the operation mode and details about the warnings are displayed in the service mode. The warnings include at least one of a fault icon, a fault code or a fault LED.

In some embodiments, the portable plasma arc cutting system also includes a control panel disposed on the portable plasma arc cutting system. The control panel can include the user activated switch and a user interface. In some embodiments, the user interface is an LCD-type user interface. In some embodiments, the user interface includes a LED. In some embodiments, the user interface includes an electronic device capable of displaying two distinct states (e.g., on or off) such as a light bulb.

In some embodiments, the power supply has no buttons or controls. In some embodiments, all settings of the power supply are determined automatically, e.g., by the particular type of cartridge installed.

In another aspect, the invention features a plasma arc cutting system. The plasma arc cutting system includes a power supply and a plasma torch attachable to the power supply to generate a plasma arc. The plasma arc cutting system includes a reader associated with the plasma torch and capable of reading stored data from an identification device located on a cartridge or a consumable component of the plasma arc cutting system. The plasma arc cutting system includes a controller within the plasma arc cutting system and in communication with the power supply, the controller capable of automatically establishing operating parameters of the plasma arc cutting system based upon data stored on the identification device. The plasma arc cutting system includes an override feature that allows a user of the plasma arc cutting system to override the automatically established operating parameters and input user selected operating parameters.

In some embodiments, the identification device is a RFID tag. In some embodiments, the override feature is remotely located on a wirelessly-connected mobile device. In some embodiments, the mobile device is a mobile phone. In some embodiments, the mobile device is in wireless communication with the controller. In some embodiments, the power supply and the controller have no external user operated controls for establishing the operating parameters. In some embodiments, a LED is located on the power supply, the LED capable of displaying a plurality of colors, each color corresponding to an operating mode of the plasma arc cutting system.

The invention also features a method for configuring the plasma arc cutting system. The method includes installing the cartridge or consumable in the plasma torch; reading data on the cartridge or consumable; establishing the operating conditions of the plasma arc cutting system based on the information on the stored data of the identification device; receiving an override signal from a user; and/or receiving a user selected set of operating conditions.

In some embodiments, the override feature further comprises at least one dial or button for adjusting at least one of the current level, gas pressure or the gas flow rate from the automatically establishing operating parameters. In some embodiments, the operating parameters are at least one of a current setting, power supply type, torch type, material type, cutting surface, or material thickness. In some embodiments, memory is disposed in the power supply and is in communication with the controller. The memory can be configured to save at least one of the operating parameters last manually entered into the plasma arc cutting system by the user. In some embodiments, the torch is a handheld torch.

In another aspect, the invention features a plasma arc cutting system. The plasma arc cutting system includes a power supply; a plasma torch attachable to the power supply and generating a plasma arc for cutting a workpiece; a controller in communication with the power supply; and/or a cartridge attachable to the plasma torch. The cartridge can include an identification device having information for establishing operating parameters of the plasma arc cutting system. The identification device can be readable by a reader of the plasma arc cutting system. The controller can automatically establish the operating parameters based on the information of the identification device. The power supply can include no control knobs or buttons for selecting operating parameters.

In some embodiments, the plasma arc cutting system includes a manual override feature for overriding the automatically established operating parameters and allowing a user to set custom operating parameters. In some embodiments, the manual override feature is included on a mobile device. In some embodiments, a LED is located on the power supply. The LED is capable of displaying a plurality of colors, each color corresponding to an operating mode of the plasma arc cutting system. In some embodiments, the controller is a microprocessor or a DSP. In some embodiments, the plasma arc cutting system is configured to save previously set operational settings of the plasma arc cutting system in memory. In some embodiments, the torch is a handheld torch.

In another aspect, the invention features a plasma arc cutting system including a power supply; a plasma torch operably connected to the power supply; means for automatically establishing operating parameters of the plasma torch; and/or means for manually establishing the user selected operating parameters, thereby overriding the means for automatically establishing the operating parameters.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3A is a schematic illustration of system architecture, according to an illustrative embodiment of the invention.

FIG. 8 is a schematic illustration of a service screen, according to an illustrative embodiment of the invention.

DETAILED DESCRIPTION

Figure 1:
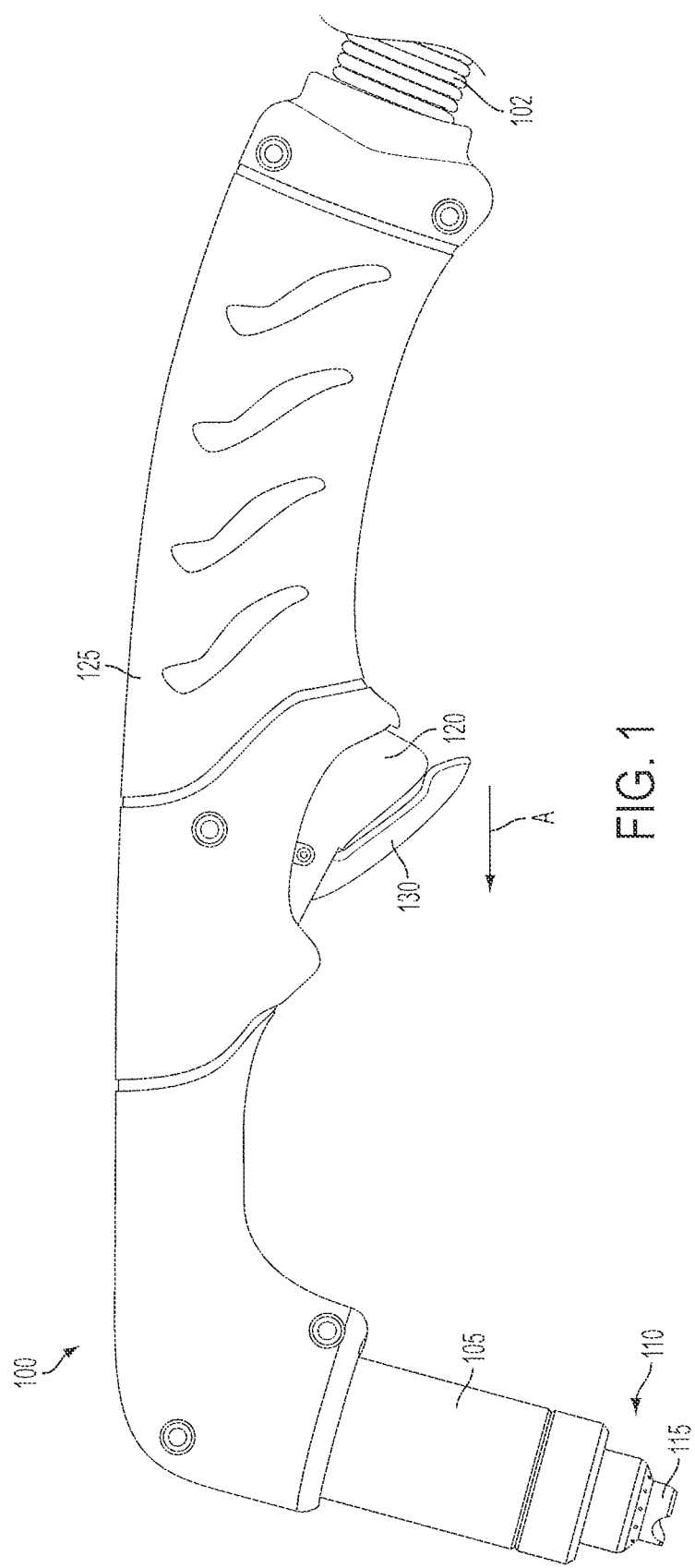
FIG. 1 is a side view of a handheld plasma arc torch.

FIG. 1 shows a portable (e.g., a handheld) plasma arc torch 100 that can generate a plasma arc for cutting a workpiece (not shown) when the plasma arc torch 100 is attached to a power supply (not shown) via connector 102, which can include, for example, electrical connections and gas flow lines. The plasma arc torch 100 generally includes a torch body 105 that defines a plasma gas flow path for directing a plasma gas to a plasma chamber in which a plasma arc is formed. An electrode (not shown) is disposed within the torch body 105. A nozzle (not shown) with a central exit orifice is disposed relative to the electrode at a distal end 110 of the torch body 105. The plasma arc torch 100 also includes a shield 115 disposed relative to an exterior surface of the nozzle at the distal end 110 of the torch body 105.

Portable plasma arc torches can be trigger-activated devices. That is, the torch 100 generates a plasma stream in response to operator activation of a trigger 120 disposed in the torch housing 125. Optionally, a displaceable safety member 130 can be disposed adjacent to the front surface of the trigger 120 to prevent the trigger 120 from inadvertently starting the plasma arc torch. For example, the safety member 130 can have two positions. In a first position, as shown in FIG. 1, the safety member 130 prevents an operator from activating the trigger 120. In a second position (e.g., when the safety member 130 is moved in the direction generally shown by arrow A), an operator can activate the trigger 120 to start the plasma arc torch 100 (see, for example, U.S. Pat. No. 5,597,497 to Hypertherm, Inc., the entire contents of which is hereby incorporated herein by reference).

Figure 2:
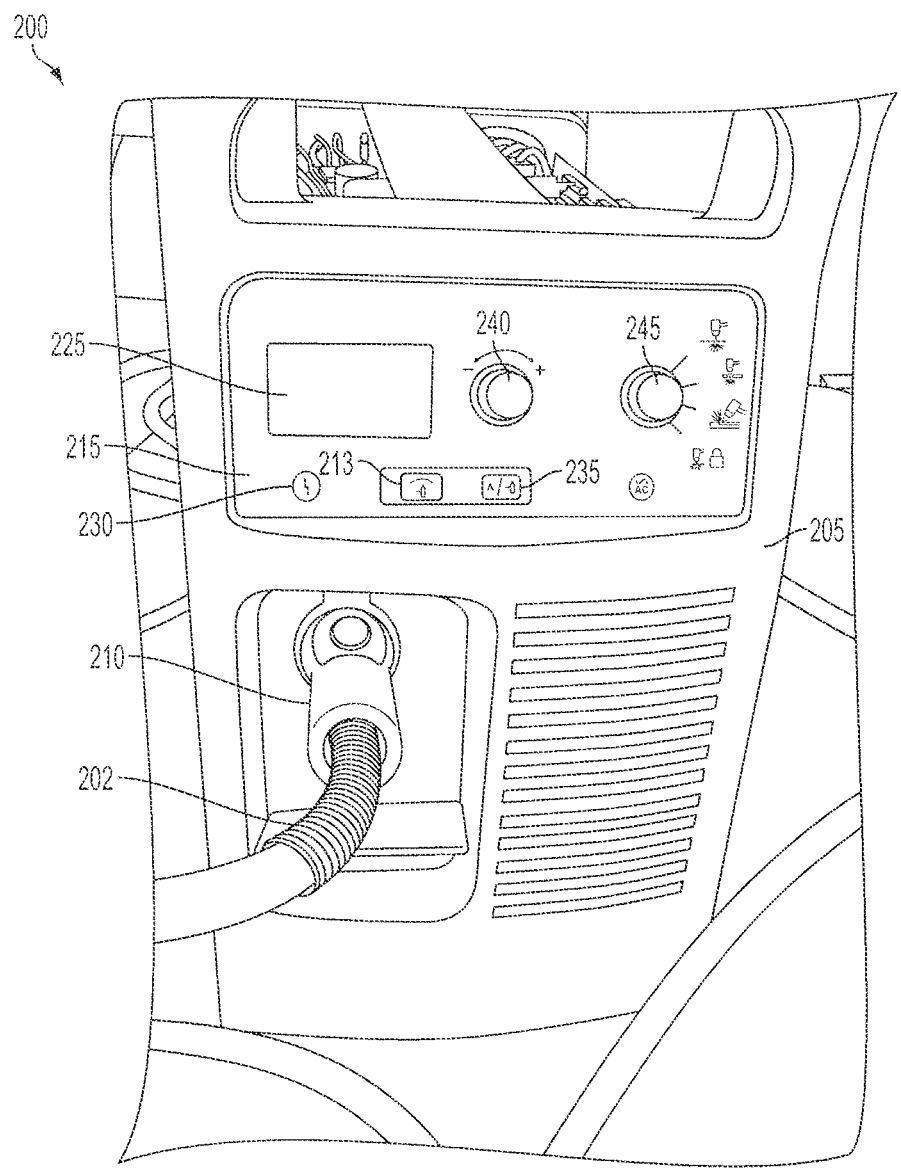
FIG. 2 is a front view of a portable plasma arc cutting system, according to an illustrative embodiment of the invention.

FIG. 2 shows a portable plasma arc cutting system 200 including an outer casing 205 that can house a power supply, a gas valve, and/or a controller. A handheld plasma arc torch (e.g., the plasma arc torch 100 of FIG. 1) can be attached to the power supply 205 at a connection area 210, for example, via connector 202, which can include, for example, electrical connections and gas flow lines. The connector 102, 202 can be flexible to allow easy maneuverability of the handheld plasma arc torch.

The portable plasma arc cutting system 200 can include a user activated switch 213 that can be used to switch between at least two settings. In some embodiments, a control panel 215 is disposed on the plasma arc cutting system 200 that comprises the user activated switch 213 and a user interface 225. The user interface 225 can be an LCD-type user interface, an LED-type user interface, a computer screen, a touch screen display, a video display, or any other type of user interface. The control panel 215 can also include, for example, a fault light 230 (e.g., an LED indicator light), a current/pressure selection button 235, a dial 240, and/or a cutting type knob 245. Although certain features of the control panel 215 are shown using knobs and buttons, any type of mechanism can be used, for example, dials, knobs, buttons, slide bars, toggles, keys, touch screens, switches, or any combination thereof.

In some embodiments, a display (not shown) is disposed on the portable plasma arc cutting system 200 and can be used to provide the operator with information concerning errors that occur within the portable plasma arc cutting system. The display can be disposed on the control panel 215, and can be in addition to the user interface 225 or can be part of the user interface 225. The display can provide a user with information about the portable plasma arc cutting system 200 and can have at least two modes. An operation mode can display operation data about the plasma arc cutting system 200, for example, cutting current, gas pressure, gas flow rate, cutting type, or any combination thereof. A service mode can display fault data about the plasma arc cutting system 200, for example, fault codes.

The operation mode can display warnings in addition to operation data. The details of the warnings can be displayed in the service mode. For example, the warnings can include a fault icon, a fault code, and/or a fault LED. The warning can alert the user that something is wrong with the plasma arc cutting system 200. The details that gave rise to the warning can be displayed in the service mode.

FIG. 3A shows an example of system architecture 300 that can be used within the portable plasma arc cutting system to enable an operator to switch between manually and automatically establishing a gas flow rate or a gas pressure. The system architecture 300 can also enable the operator to switch the user interface or display from operation mode to service mode.

As shown in FIG. 3A, a controller 305 is disposed within the portable plasma arc cutting system, for example, the portable plasma arc cutting system 200 of FIG. 2. The controller 305 is in communication with a power supply 310 and is capable of automatically manipulating the gas valve (not shown) to establish the gas flow rate or the gas pressure based upon a predetermined operating condition. The controller 305 can also manipulate the gas valve to establish a user-determined gas flow rate or a user-determined gas pressure. The controller 305 is also in communication with the control panel 315 over communication line 320. In some embodiments, the controller is in communication with the control panel 315 over a wireless network.

The power supply 310 can be a power printed circuit board ("PCB") that can comprise most of the power components and hardware fault monitoring functions. A digital signal processor ("DSP") PCB can be used as the controller 305 and can be attached to the power PCB. The DSP PCB can comprise a single chip DSP that implements control and/or sequencing algorithms. A control PCB with a microcontroller can be used as the control panel 315 and can implement the user interface functions. The control PCB and the DSP PCB can be communication through a serial link of the ModBus over RS486 and can serve as the communication line 320. The DSP PCB can handle all of the faults and/or errors and can populate the fault flags into a fault table. It can also summarize the faults into predefined standard fault codes and display codes that can be passed to the control PCB for display.

Similar to FIG. 2, the control panel 315 of FIG. 3A can include a user activated switch 313, a user interface 325, fault lights 330, a current/pressure selection button 335, a dial 340, and/or a cutting type knob 345. In some embodiments, the controller 305 is capable of displaying operation mode or service mode data on a display, for example, the user interface 225 of FIG. 2, in response to a user selecting service mode or operation mode via the user activated switch. The controller 305 can be a microcontroller, a CPU controller, a DSP controller, or any other type of controller that is capable of automatically manipulating a gas valve.

Figure 3B:
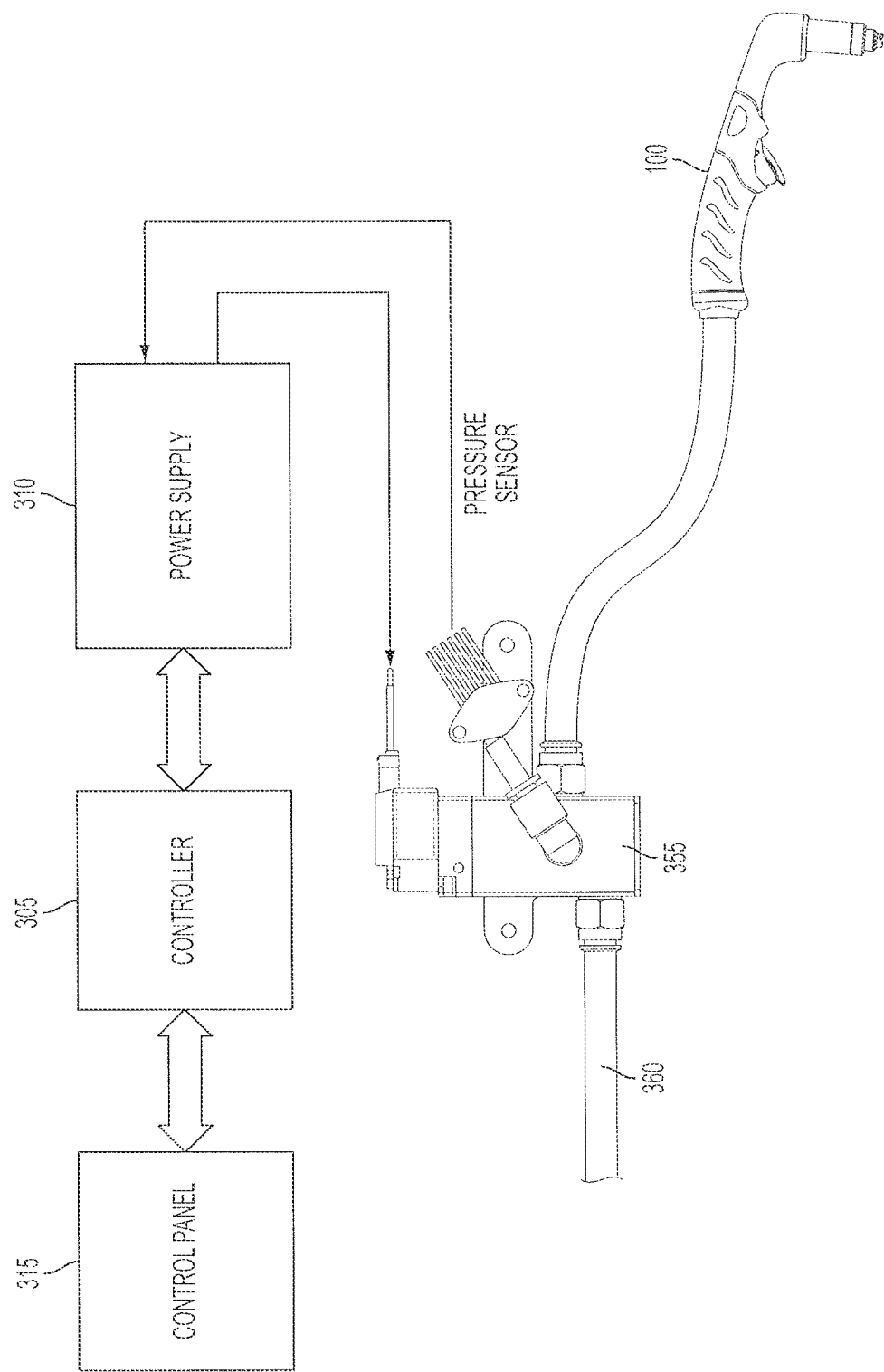
FIG. 3B is a schematic illustration of a plasma arc torch system including a gas valve, according to an illustrative embodiment of the invention.

FIG. 3B shows a plasma arc torch system 350 including a gas valve 355 that can be housed in an outer casing (e.g., outer casing 205 of FIG. 2). In some embodiments, the gas valve 355 is disposed in the handheld plasma arc torch instead of housed in the outer casing (e.g., outer casing 205 of FIG. 2). Gas enters the plasma arc torch system 350 from gas input 360. The gas valve 355 establishes a gas flow rate or a gas pressure of the plasma arc torch. The controller 305 is in communication with a power supply 310 and is capable of automatically manipulating the gas valve 355 (e.g., changing the gas valve from a closed position to an open position or to a partially open position) to establish the gas flow rate or the gas pressure based upon a predetermined operating condition. The controller 305 can also manipulate the gas valve 355 to establish a user-determined gas flow rate or a user-determined gas pressure.

The user activated switch (e.g., the user activated switch 213 of FIG. 2) can have a variety of settings or multiple user activated switches can be used. In some embodiments, the user activated switch has two settings, a first setting and a second setting. When the user activated switch is in the first setting, the controller 305 automatically establishes the gas flow rate or the gas pressure based upon a predetermined operating condition. The predetermined operating condition can be, for example, a current setting, a power supply type, a torch type, a material type, a cutting surface, a material thickness, or any combination thereof. The predetermined operating condition or conditions can be entered by the user prior to starting the plasma arc torch via the control panel, display screen and/or user interface. For example, the predetermined operating condition can be the type of cut that is being made (e.g., a gouging type cut). The operating can select this type of cut by adjusting cutting type knob 245 of FIG. 2 and the controller can automatically set the gas flow rate or gas pressure based on the user-entered cut type.

In some embodiments, the controller automatically establishes the gas flow rate or gas pressure by using a pre-defined parameter table that can be stored in a memory. The memory can be disposed within the portable plasma arc cutting system, for example, in the power supply. The memory is in communication with the controller 305. The pre-defined parameter table can be pre-loaded into the portable plasma arc cutting system and can enable the controller to look up various variables or operating conditions (e.g., a current setting, a power supply type, a torch type, a material type, a cutting surface, a material thickness, or any combination thereof) and select an appropriate gas flow rate and/or gas pressure based on these operating condition(s). The parameter table can be indexed by a variety of different variables including, for example, torch type (e.g., a handheld torch or a mechanized torch), the torch length, and/or the cut mode (e.g., cutting or gouging).

When the user activated switch is in the second setting, the user inputs a gas flow rate or a gas pressure, for example, by adjusting dial 240 of FIG. 2, and the controller 305 establishes this user-determined gas flow rate or gas pressure by manipulating the gas valve. In the second setting, the controller does not have to look up the gas flow rate or gas pressure in a pre-defined parameter table because this information has been input into the plasma system by the operator.

The operator can decide to switch between the first and second settings based on the operators' desire to control the specific operating parameters (e.g., current, gas pressure or gas current, and/or operating mode) of the torch. For example, the operator can decide to manually operate the plasma arc torch to optimize the cutting procedure after the portable plasma arc torch has been operating automatically, or in the first setting. In some embodiments, this manual operation can occur via a mobile device, such as a mobile phone. The user can stop the torch (e.g., by releasing the trigger 120 of FIG. 1) and adjust the user activated switch to the second or manual setting (e.g., by pressing button 213 of FIG. 2, or by holding down button 213 for a specified period of time, for example, two to five seconds). In the second setting, the controller (e.g., controller 305 of FIG. 3) establishes one of a user-determined gas flow rate or a user-determined gas pressure. For example, referring to FIG. 2, the gas flow rate and/or the gas pressure can be displayed on the user interface 225 and the user can increase or decrease the gas flow rate and/or the gas pressure by adjusting dial 240 when the user activated switch 213 is in the second setting.

In some embodiments, the user activated switch 213 has more than two settings. For example, in addition to the first and second settings, the user activated switch 213 can have an operation setting that causes the controller to provide operation mode data to the display and a service setting that causes the controller to provide service mode data to the display. The switch 213 can be configured to enable to user to toggle between at least the operation and service settings. In some embodiments, the switch 213 is configured to enable to the user to toggle between the first, second, operation and service settings.

In some embodiments, there are multiple user activated switches. For example, there can be a first user activated switch that can allow the user to toggle between the first and second settings and a second user activated switch that can allow the user to toggle between the operation and service settings. In some embodiments, the operation mode is the same as the first or second setting, depending on whether the portable plasma arc torch is being operated automatically or manually. The control panel can also have a series of keys, for example three or four, which allow the user to toggle between the first, second, operation, and service settings. In some embodiments, the user can enter the service setting by pushing the user activated switch 213 and the current/pressure selection button 235 simultaneously.

Referring to FIG. 2, the user interface 225 can display different information using multiple different displays when the plasma arc torch is being operated in an automatic mode or in a manual mode. For example, when the user activated switch 213 is in the first setting and the handheld plasma arc torch is being operated automatically, a first display screen can be displayed. When the user activated switch 213 is in the second setting and the handheld plasma arc torch is being operated manually, a manual display screen can be displayed. The manual display screen can display a pressure or flow rate setting which is indicative to the gas pressure or flow rate supplied to the torch and can allow the user to manipulate these settings.

In addition, the user interface 225 can display operation mode data in the operation setting and service data in the service setting. In some embodiments, the operation mode data is displayed in the manual display screen and/or the first or automatic display screen.

Figure 4:
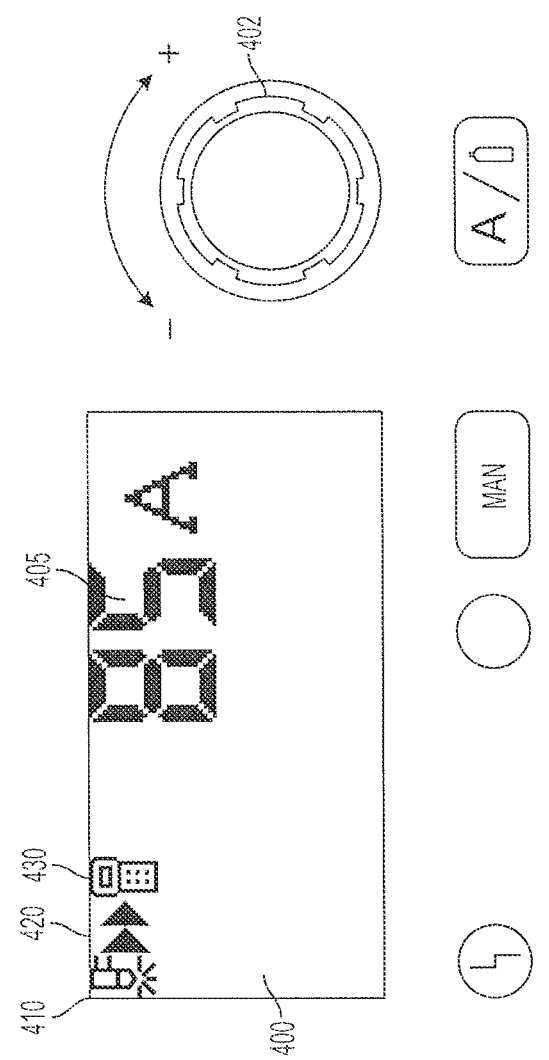
FIG. 4 is a schematic illustration of an automatic gas pressure or flow rate setting mode, according to an illustrative embodiment of the invention.
Figure 5:
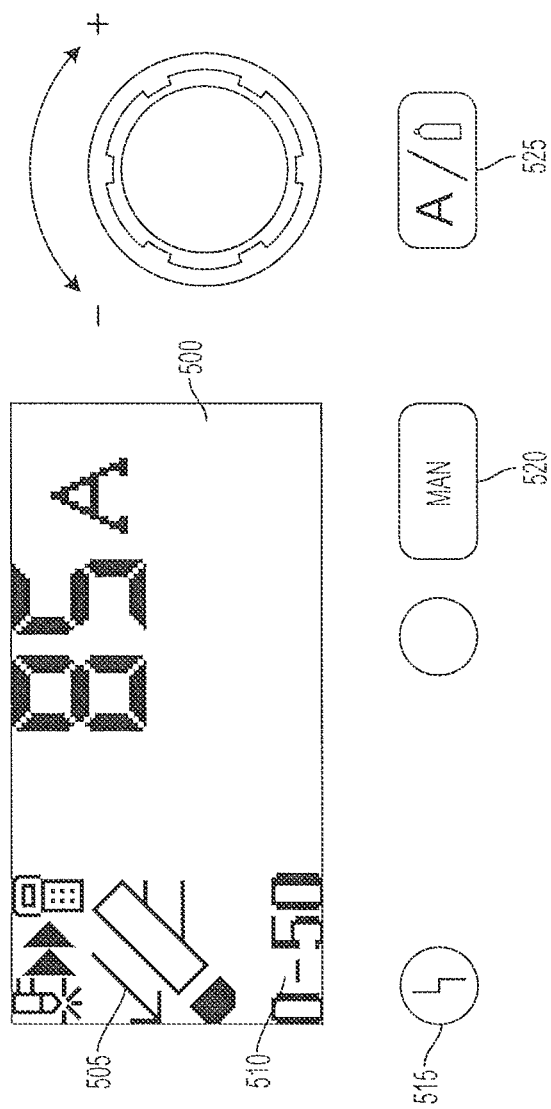
FIG. 5 is a schematic illustration of an automatic gas pressure or flow rate setting mode with fault icons, according to an illustrative embodiment of the invention.
Figure 6:
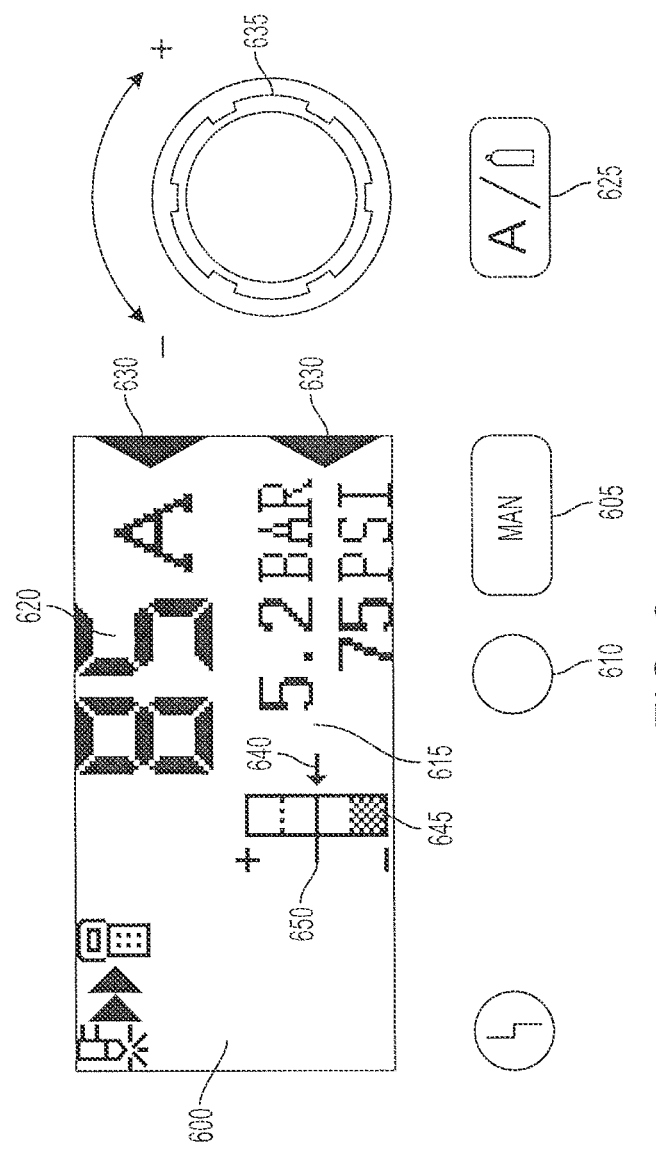
FIG. 6 is a schematic illustration of a manual gas pressure or flow rate setting mode, according to an illustrative embodiment of the invention.
Figure 7:
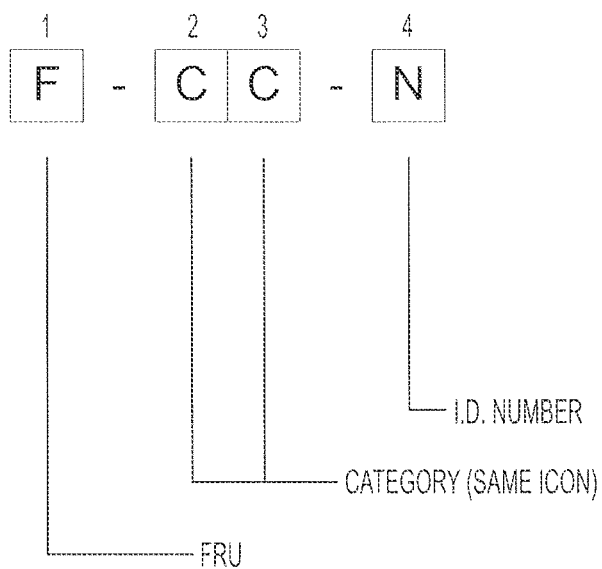
FIG. 7 is a schematic illustration of a fault code, according to an illustrative embodiment of the invention.
Figure 8:
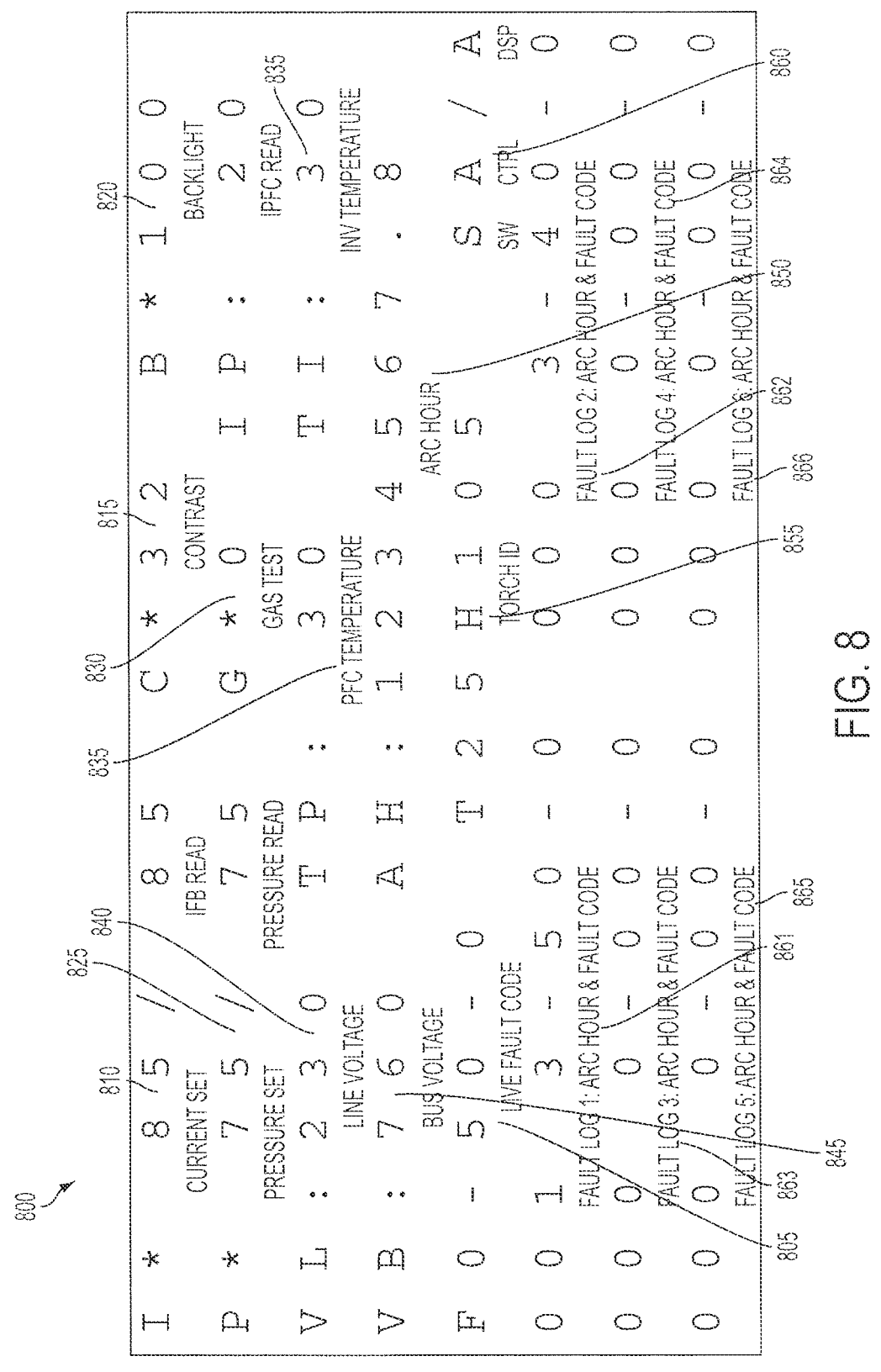

FIGS. 4-8 depict the variety of different information that can be displayed on the user interface and/or display. FIG. 4 is a schematic illustration of an automatic gas pressure or flow rate setting mode; FIG. 5 is a schematic illustration of an automatic gas pressure or flow rate setting mode with fault icons; FIG. 6 is a schematic illustration of a manual gas pressure or flow rate setting mode; FIG. 7 is a schematic illustration of a fault code; and FIG. 8 is a schematic illustration of a service screen.

Referring to FIG. 4, an example of a display screen 400 is shown when the portable plasma arc torch is in the first or automatic gas pressure setting mode under normal operation. In the automatic gas pressure setting mode, the gas pressure can set based on a pre-defined parameter table stored in memory. In the automatic gas pressure setting mode, the operator adjusts the cutting current, for example, by adjusting the knob 402. When the knob is turned, the current setting 405 on the display screen 400 is updated to inform the operator of the new current setting and the controller automatically adjusts the gas flow rate or the gas pressure based on the selected cutting current and the pre-defined parameter table.

The display screen 400 can have several different icons that can quickly inform the operator about the plasma arc torch operating parameters. In some embodiments, each operating parameter has a separate icon. For example, the display screen 400 indicates a current setting 405 and that the current is set at 85 Amps.

When the portable plasma arc torch is started (e.g., when the user presses trigger 120 of FIG. 1), the power supply will start to pilot and the screen 400 can display the start icon 410. When the portable plasma arc torch starts to cut after the arc is transferred to the workpiece, the display screen 400 can display the mech. motion icon 420.

In some embodiments, the power supply is controlled by a remote controller, for example, a computer numeric controller ("CNC"). When the power supply is controlled by a remote controller, the remote icon 430 can be displayed on the screen 400. In some embodiments, all of the local controls are displayed when the power supply is controlled by a remote controller.

Referring to FIG. 5, if a fault or error occurs within the portable plasma arc cutting system, the display screen 500 can display a fault icon 505, and/or a fault code 510. The fault icon 505 can be displayed either with or without the fault code 510. The fault icon 505 can quickly alert the operator to what caused the fault. The fault code 510 can be displayed in a short and grouped format. For example, in FIG. 5 the fault code 510 is displayed as 0-50. A fault code of 0-50 can represent, for example, that there is a problem with a consumable. A fault LED 515 can also light up when a fault occurs as an additional means to alert the operator that something is wrong with the portable plasma arc cutting system.

FIG. 6 illustrates an example of a display screen 600 when an operator is using the second or manual gas pressure setting mode in normal operation. The operator can switch between manual and automatic mode by pushing the user-activated switch, shown in FIG. 6 as a "Manual/Auto" button 605, on the display screen. After the "Manual/Auto" selection button 605 is pushed, the system enters the manual gas pressure setting mode. The Manual LED 610 can light up to indicate that the portable plasma arc system is in the manual gas pressure or gas flow setting mode (e.g., the second setting). The gas pressure setting 615 can be displayed on the screen. In this mode, the current setting 620 or gas pressure setting 615 can be adjusted by selecting the "Current/Pressure" selection button 625. The cursor 630 can indicate whether the current setting 620 or the gas pressure setting 615 will be changed when the adjustment knob 635 is manipulated. Pushing the "Manual/Auto" selection button 605 again will exit the "manual gas pressure setting" mode and enter the "automatic gas pressure setting" mode (e.g., the mode displayed in display screen 400 of FIG. 4).

When the operator is adjusting the gas pressure setting 615, an arrow 640 of a pressure bar 645 can move up or down, depending on whether the pressure is being increased or decreased, respectively. The center point 650 of the pressure bar 645 can be the nominal pressure value when the portable plasma arc torch is being operated in the automatic gas pressure setting. In some embodiments, the maximum and minimum amount of pressure, or the maximum and minimum change in the pressure, is pre-set. This can be a fail-safe to ensure that the operator does not enter a pressure that is too high or too low for the portable plasma arc torch cutting system to operate.

The operator can toggle between automatic gas pressure setting mode and manual gas pressure setting mode, for example by pushing the "Manual/Auto" selection button 605. When the operator exits manual gas pressure setting mode, the system can store the manual settings that were entered by the user in memory and display those settings when the operator returns to manual mode. In some embodiments, the system can store multiple manual settings in memory. The memory can be configured to save at least one of the predetermined operating condition, the user-determined gas flow rate or the user-determined gas pressure that was last entered into the plasma arc cutting system.

The control panel and display screen of the portable plasma arc cutting system can also be used to enter and exit a service mode. In some embodiments, the service mode can be entered by pressing the "Manual/Auto" selection button 605 or holding the "Manual/Auto" selection button 605 down for a predetermined amount of time (e.g., two to five seconds). Service mode can also be entered by pushing the "Manual/Auto" selection button 605 and the "Current/Pressure" section button 625 simultaneously for a predetermined amount of time (e.g., two to five seconds). Requiring an operator to hold down the buttons for a predetermined period of time can prevent the operator from inadvertently entering the service mode. In some embodiments, service mode is entered immediately when the "Manual/Auto" selection button 605 and the "Current/Pressure" section button 625 are pressed simultaneously. In some embodiments, a separate button or toggle is used to enter the service mode.

The system can also display a fault log with full length fault codes. FIG. 7 illustrates an example of a full length fault code 700 (for example, the fault code 700 can be the full length fault code of the fault code 510 of FIG. 5). The fault code 700 can have four numbers (e.g., represented by the numbers 1-4 on FIG. 7); however, more or less numbers can be used depending on the amount of information to be displayed. The four numbers of the fault code 700 represent different information about the fault or error that occurred within the portable plasma arc torch system. For example, the first number of the fault code 700 can display the Field Replicable Unit ("FRU), which indicates on which part or subassembly the error occurred. The second and third numbers of the fault code 700 can display the Category, which groups the errors or failures based on the type of fault that occurred, for example, operational, hardware, and/or a warning. The fourth number of the fault code 700 can display the I.D. Number, which can correspond to a specific description in a table that the operator can look up when calling a service center. The I.D. Number can provide the operator with a more detailed description of the error than the other numbers of the fault code 700. In some embodiments, a manual can list all of the fault codes and provide additional detail about why the fault was triggered. The fault code 700 can be cross-referenced with the manual to determine why the fault was triggered and/or how to fix the problem.

A fault priority can be assigned based on the fault code value. For example, the bigger the number, the higher the fault priority. In some embodiments, only one fault code is set at a time. In this embodiment, if there are multiple faults, then only the fault with the highest priority will be displayed.

The service mode screen can display the environment and operation variables of the plasma arc torch system. For example, the service mode screen can display temperature measurements, which are not displayed during normal operation.

FIG. 8 illustrates an example of a service screen 800. As an example, referring to FIG. 5, the fault code 510 that is displayed on the normal operation display screen is 0-50. If the operator wants to obtain additional information about this fault, the operator can enter service mode by pressing the "Manual/Auto" selection button 520 and the "Current/Pressure" section button 525 together for two seconds to enter service mode. When service mode is entered, the operator can see a screen that resembles service screen 800. This screen 800 provides the operator with an additional layer of information about the fault 510 of FIG. 5 as shown by fault 805. The operator can look up fault code 0-50-0 in a manual to obtain additional information about the fault. As shown in FIGS. 5 and 8, the fault code is only displayed in full in the service mode. In the operation mode, only two to three digits are displayed.

In some embodiments, the portable plasma arc cutting system can store a limited number of faults, for example four to fifty faults in a non-volatile memory as a fault log. The fault log can include data about the faults, including, for example, the time of the fault, the fault code, or the operating conditions under which the fault occurred. This can be particularly useful when the system needs to be repaired or serviced since a repairman will be able to see the previous errors that occurred within the portable plasma arc cutting system.

While in the service screen 800 the operator can also make necessary adjustments to current 810, contrast 815, backlight 820, pressure setting 825, and gas test 830. The parameters that can be adjusted are highlighted by the * mark in FIG. 8. In addition, the operator can see additional features in the service mode that the operator cannot see in other modes, for example the temperature of the primary power components 835, input line and bus voltage 840, 845 respectively, cumulative arc hours of system operation 850, torch ID 855, software control revision 860, and recording of the last 6 faults events and their time of occurrence 861, 862, 863, 864, 865, 866.

Figure 9:
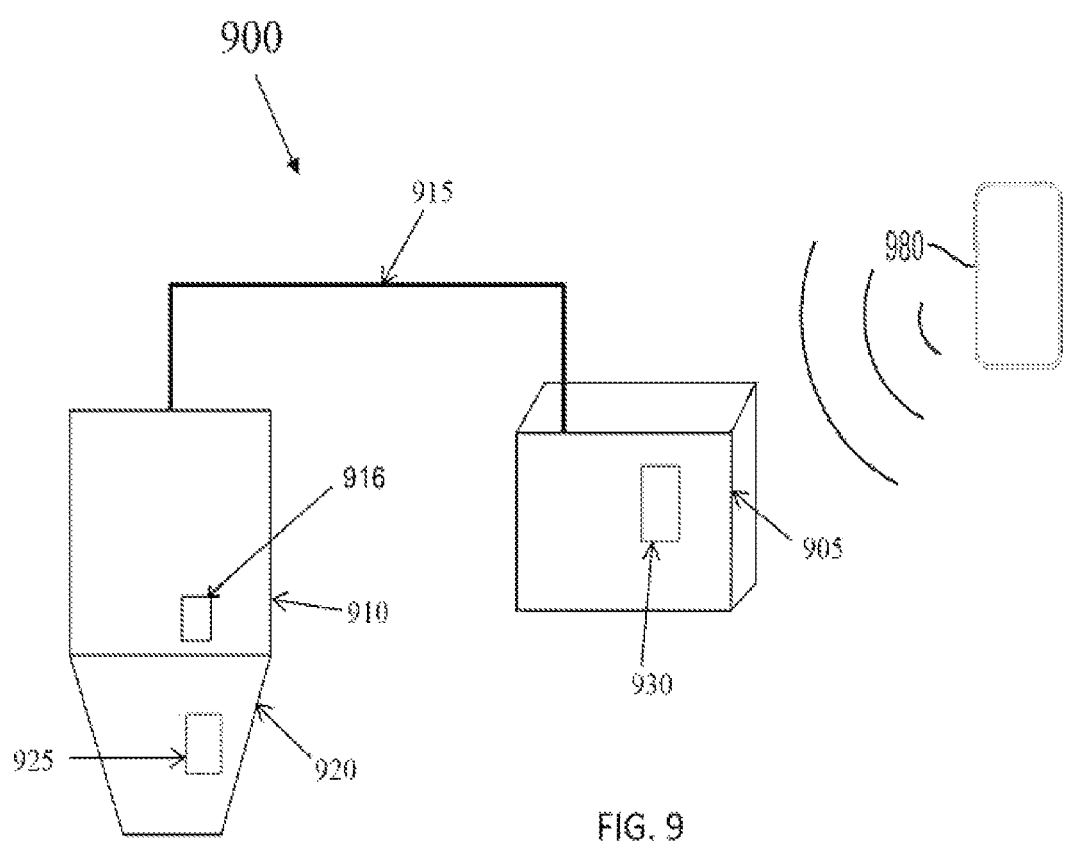
FIG. 9 is a schematic illustration of a system architecture including a cartridge and a mobile device, according to an illustrative embodiment of the invention.
Figure 9A:
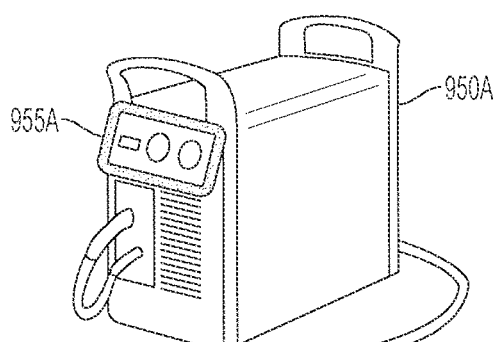
FIGS. 9A-9D are schematic illustrations of power supplies including a color LED corresponding to a color of a cartridge, according to an illustrative embodiment of the invention.
Figure 9B:
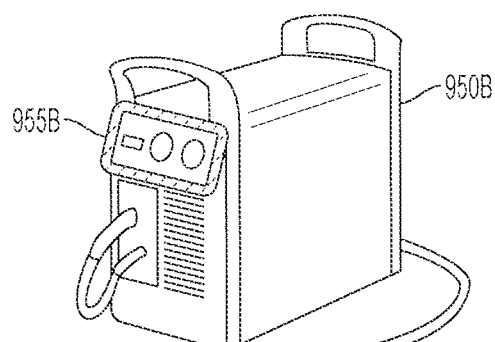
Figure 9C:
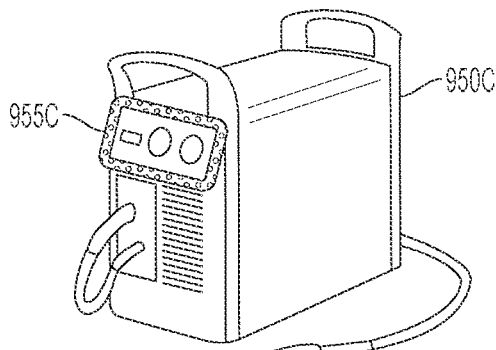
Figure 9D:
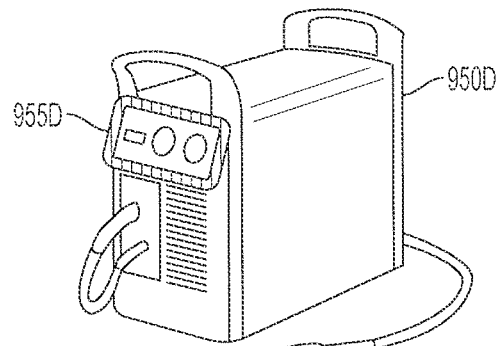

FIG. 9 is a schematic illustration of a system architecture including a cartridge, according to an illustrative embodiment of the invention. In addition to the aspects of the invention already described, the plasma arc torch system 900 can include a power supply 905 and a plasma torch 910. The plasma torch 910 can be connected to the power supply 905 by a connector 915, such as a torch lead. A cartridge 920 is attachable to the plasma torch 910. The cartridge 920 can include an identification device 925 including information that can be used to establish operating parameters of the torch. The operating parameters can include current, gas, and mode settings of the power supply 920. In some embodiments, one or more of the operating parameters correspond to a predetermined operating condition of the plasma arc torch, e.g., as described above. The identification device 925 can be readable by a reader 916 of the plasma arc torch system 900. The identification mechanism can be a RFID tag or other device capable of storing operating data and communicating information to the reader 916 wirelessly. In some embodiments, individual consumables (such as an electrode, nozzle shield, and/or swirl ring) can include one or more RFID tags including information for establishing the operating parameters of the torch.

In some embodiments, the power supply includes no further user controls, with all necessary cutting parameters determined by the cartridge 920 or consumables installed. The plasma arc torch system 900 can further include an override feature that allows a user of the plasma arc torch system 900 to override the automatically determined operating parameters. The override feature can be included in a mobile device 980 in communication with the power supply 905. The communication can be via a wireless technology, such as Bluetooth or Wifi, or via a wire, such as a USB connection. In some embodiments using a mobile device, a mobile application (or "app") can be provided that allows the user to override the operating parameters established by the information on a RFID tag or similar device. The operator can then set his own operating parameters (e.g., cutting current, gas pressure, gas flow rate, cutting type, or any combination thereof). In power supplies having user controls (similar to that shown in FIG. 2) the operator can use the dial 240 and/or a cutting type knob 245 to override the operating parameters established by the information on a RFID tag or similar device. In some embodiments, the system is capable of being fully configured automatically with all operating parameters. In some embodiments, the system is capable of having a full and/or partial manual override of the automatically established operating parameters.

In some embodiments, the power supply 905 includes a feature 930. The feature 930 can be a display, such as a LED or light bulb(s). The LED or light bulb(s) can include multiple color settings that correspond to a type of cartridge 920, a consumable setup installed in the torch 910 and/or an operating mode of the plasma arc cutting system. For example, a red light could indicate a cutting setup is installed, while a yellow light could indicate a gouging setup is installed. Using such a configuration, an operator can receive visual feedback at a distance from the power supply 905 of the operating mode of the power supply 905. The power supply can have multiple states (e.g., states 950A-950D illustrated in FIGS. 9A-9D). A first power supply state 950A can include an LED that lights up with a first color 955A. A second power supply state 950B can correspond to a second color 955B; a third power supply state 950C can correspond to a third color 955C; a fourth power supply state 950D can correspond to a fourth color 955D. Each LED color 955A-955D can correspond to a color band 960A-960D, respectively, of a particular cartridge installed in the system.

Although various aspects of the disclosed apparatus and method have been shown and described, modifications may occur to those skilled in the art upon reading the specification. The present application includes such modifications and is limited only by the scope of the claims.

What is claimed is:

1. A plasma arc cutting system comprising:
   a power supply;
   a plasma torch attachable to the power supply to generate a plasma arc;
   an identification device located on a cartridge or a consumable component of the plasma arc cutting system, the identification device containing information establishing necessary operating parameters such that the power supply requires no further user controls when the plasma torch uses automatically established operating parameters;
   a reader associated with the plasma torch and capable of reading stored data from the identification device
   a controller within the plasma arc cutting system and in communication with the reader and the power supply, the controller capable of automatically establishing operating parameters of the plasma arc cutting system based upon the data stored on the identification device;
   a switch means, in communication with the power supply and activatable by a user of the plasma arc cutting system, for toggling between the automatically established operating parameters and a set of user-selected operating parameters; and
   a means for storing at least one of the operating parameters last manually entered into the plasma arc cutting system by the user, the means for storing disposed in the power supply and in communication with the controller.

2. The plasma arc cutting system of claim 1, wherein the identification device is a RFID tag.

3. The plasma arc cutting system of claim 1 wherein the switch means is remotely located on a wirelessly-connected mobile device.

4. The plasma arc cutting system of claim 3 wherein the mobile device is a mobile phone.

5. The plasma arc cutting system of claim 3 wherein the mobile device is in wireless communication with the controller.

6. The plasma arc cutting system of claim 1 wherein the power supply and the controller have no external user operated controls for establishing the operating parameters.

7. The plasma arc cutting system of claim 1 further comprising a LED located on the power supply, wherein the LED is capable of displaying a plurality of colors, each color corresponding to an operating mode of the plasma arc cutting system.

8. A method for configuring the plasma arc cutting system of claim 1 including:
  installing the cartridge or consumable in the plasma torch;
  reading data on the cartridge or consumable;
  establishing the operating conditions of the plasma arc cutting system based on the information on the stored data of the identification device;
  receiving an override signal from a user;
  receiving a user selected set of operating conditions.

9. The plasma arc cutting system of claim 1 wherein the switch means further comprises at least one dial or button for adjusting at least one of the current level, gas pressure or the gas flow rate from the automatically establishing operating parameters.

10. The plasma arc cutting system of claim 1 wherein the operating parameters are at least one of a current setting, power supply type, torch type, material type, cutting surface, or material thickness.

11. The plasma arc cutting system of claim 1 further comprising memory disposed in the power supply and in communication with the controller, the memory configured to save at least one of the operating parameters last manually entered into the plasma arc cutting system by the user.

12. The plasma arc cutting system of claim 1 wherein the torch is a handheld torch.

13. A plasma arc cutting system comprising:
  a power supply;
  a plasma torch attachable to the power supply and generating a plasma arc for cutting a work piece;
  a controller in communication with the power supply, the controller capable of automatically establishing operating parameters of the plasma arc cutting system;
  a cartridge attachable to the plasma torch, the cartridge including an identification device located on the cartridge or a consumable component of the plasma arc cutting system, the identification device having information for automatically establishing necessary operating parameters of the plasma arc cutting system such that the power supply requires no further user controls when the plasma torch uses automatically established operating parameters, the identification device readable by a reader of the plasma arc cutting system;
  a means for storing at least one operating parameter last manually entered into the plasma arc cutting system by the user, the means for storing disposed in the power supply and in communication with the controller; and
  a switch means, activatable by a user of the plasma arc cutting system, for toggling between the automatically established operating parameters and a user-selected set of operating conditions,
  wherein the controller automatically establishes the operating parameters based on the information of the identification device; and
  wherein the power supply includes no control knobs or buttons for selecting operating parameters.

14. The plasma arc cutting system of claim 13 wherein the switch means is included on a mobile device.

15. The plasma arc cutting system of claim 13 further comprising a LED located on the power supply, wherein the LED is capable of displaying a plurality of colors, each color corresponding to an operating mode of the plasma arc cutting system.

16. The plasma arc cutting system of claim 13 wherein the controller is a microprocessor or a DSP.

17. The plasma arc cutting system of claim 13 wherein the plasma arc cutting system is configured to save previously set operational settings of the plasma arc cutting system in memory.

18. The plasma arc cutting system of claim 13 wherein the torch is a handheld torch.

19. A plasma arc cutting system comprising:
  a power supply;
  a plasma torch operably connected to the power supply;
  means for automatically establishing operating parameters of the plasma torch;
  means for manually establishing user selected operating parameters, thereby overriding the means for automatically establishing the operating parameters;
  an identification device located on a cartridge or a consumable component of the plasma arc cutting system, the identification device containing information establishing necessary operating parameters such that the power supply requires no further user controls when the plasma torch uses automatically established operating parameters;
  a reader associated with the plasma torch and capable of reading stored data from the identification device;
  a means for storing at least one operating parameter manually entered into the plasma arc cutting system by the user, the means for storing disposed in the power supply and in communication with a controller of the plasma arc cutting system; and
  a switch means for toggling between the automatically established operating parameters and the user selected set of operating conditions, the switch means for toggling activatable by a user of the plasma arc cutting system.

* * * * *